US011702365B2

(12) United States Patent
Schumacher

(10) Patent No.: US 11,702,365 B2
(45) Date of Patent: Jul. 18, 2023

(54) CORROSION MITIGATING CEMENT COMPOSITIONS

(71) Applicant: SCMT HOLDINGS PTY LTD, South Carlton (AU)

(72) Inventor: Glenn Olven Schumacher, Crownsville, MD (US)

(73) Assignee: FORTCEM PTY LIMITED, Hong Kong (HK)

( * ) Notice: Subject to any disclaimer, the term of this patent is extended or adjusted under 35 U.S.C. 154(b) by 199 days.

(21) Appl. No.: 16/975,698

(22) PCT Filed: Feb. 26, 2019

(86) PCT No.: PCT/AU2019/050161
§ 371 (c)(1),
(2) Date: Aug. 25, 2020

(87) PCT Pub. No.: WO2019/161460
PCT Pub. Date: Aug. 29, 2019

(65) Prior Publication Data
US 2020/0399178 A1     Dec. 24, 2020

Related U.S. Application Data

(60) Provisional application No. 62/635,108, filed on Feb. 26, 2018.

(51) Int. Cl.
| | |
|---|---|
| C04B 28/08 | (2006.01) |
| C04B 22/06 | (2006.01) |
| C04B 22/08 | (2006.01) |
| C04B 22/10 | (2006.01) |
| C04B 24/04 | (2006.01) |
| C04B 28/04 | (2006.01) |
| C04B 103/10 | (2006.01) |
| C04B 103/20 | (2006.01) |
| C04B 111/26 | (2006.01) |

(52) U.S. Cl.
CPC ............ *C04B 28/08* (2013.01); *C04B 22/062* (2013.01); *C04B 22/082* (2013.01); *C04B 22/10* (2013.01); *C04B 24/04* (2013.01); *C04B 28/04* (2013.01); *C04B 2103/10* (2013.01); *C04B 2103/20* (2013.01); *C04B 2111/26* (2013.01)

(58) Field of Classification Search
CPC ......... C04B 7/32; C04B 14/043; C04B 14/06; C04B 18/08; C04B 18/141; C04B 18/101; C04B 18/146; C04B 22/0013; C04B 22/062; C04B 22/064; C04B 22/082; C04B 22/10; C04B 22/106; C04B 22/148; C04B 24/003; C04B 24/04; C04B 24/06; C04B 28/04; C04B 28/08; C04B 40/0039; C04B 2103/0088; C04B 2103/10; C04B 2103/20; C04B 2111/26
See application file for complete search history.

(56) References Cited

U.S. PATENT DOCUMENTS

| | | | |
|---|---|---|---|
| 4,997,484 A | 3/1991 | Gravitt et al. | |
| 5,556,458 A | 9/1996 | Brook et al. | |
| 7,854,803 B1 | 12/2010 | Kirkpatrick et al. | |
| 8,016,937 B2 | 9/2011 | Schumacher et al. | |
| 8,349,072 B2 | 1/2013 | Schumacher et al. | |
| 8,747,548 B2 | 6/2014 | Schumacher et al. | |
| 2005/0274294 A1* | 12/2005 | Brower | C04B 28/02 106/677 |
| 2018/0037505 A1* | 2/2018 | Zubrod | C04B 28/02 |

FOREIGN PATENT DOCUMENTS

| | | |
|---|---|---|
| PT | 109677 A | 4/2018 |
| WO | WO 2005/123619 A2 | 12/2005 |
| WO | WO 2014/039578 A1 | 3/2014 |

OTHER PUBLICATIONS

Australian Patent Office—ISA-AU; International Search Report of PCT/AU2019/050161; dated Apr. 5, 2019.

* cited by examiner

*Primary Examiner* — Anthony J Green
(74) *Attorney, Agent, or Firm* — Kilpatrick Townsend & Stockton LLP

(57) ABSTRACT

Corrosion mitigating cement compositions and methods for their preparation are provided. The cement compositions are derived from self-cementing pozzolans and chemical accelerators, retarders, mechanical strength modifiers and corrosion inhibitors. The corrosion inhibitors include boron compounds such as boric acid. Concretes prepared using the cement compositions possess low conductivity and a conductivity which further decreases with aging.

19 Claims, No Drawings

CORROSION MITIGATING CEMENT COMPOSITIONS

CROSS-REFERENCE TO RELATED APPLICATIONS

The present application is a § 371 National Phase Application of PCT/AU2019/050161, filed Feb. 26, 2019, which application claims priority to U.S. Provisional Application No. 62/634,108, filed Feb. 26, 2018, the entire contents of which are incorporated herein by reference in their entireties for all purposes herein.

FIELD

Compositions are provided for the production of corrosion mitigating cements and their concrete and mortar derivatives for use in original construction, repair, precast block, spray and other applications. The materials are derived from controlled reactions of calcium-containing industrial by-product pozzolans with chemical accelerators, retarders, corrosion inhibitors and mechanical strength modifiers. The corrosion inhibitor increases a concrete's ability to prevent expansive corrosion reactions.

BACKGROUND

Materials with pozzolanic properties contain glassy silica and alumina that will, in the presence of water and free lime, react with the calcium to produce calcium silicate hydrates or calcium aluminum silicate hydrates. There are both natural and industrial pozzolans.

Industrial pozzolans are produced during industrial processes and include, for example, Class C and Class F fly ashes as defined in accordance with ASTM C618. These fly ashes are produced during the combustion of coal. They consist of the inorganic, incombustible matter present in the coal that has been fused during combustion into a glassy, amorphous structure. The classification of industrial produced fly ash depends on the type of coal or other fuel used and its chemical composition. The combustion of lignite or subbituminous coal typically produces Class C fly ash. The combustion of anthracite and bituminous coal typically produces Class F fly ash. The co-combustion of other fuel sources with a component bearing a calcia may also produce a suitable pozzolan. Examples include ash produced in Waste to Energy facilities or other industrial boilers that amend their coals for environmental compliance purposes. Additionally ASTM C618 includes a class N ash which is derived from natural processes whether calcined or not.

As defined by ASTM C618, the characteristics of Class C fly ash include a higher lime content than Class F fly ash and as such possess cementitious properties. The higher lime content in Class C fly ash allows Class C fly ash to be self-cementing, while Class F fly ash typically requires the addition of a lime source or cement to form cementitious materials.

An example of a natural pozzolan is Class N pozzolanic ash. Class N pozzolanic ash is a raw or calcined natural pozzolan such as some diatomaceous earths, opaline cherts, and shales, tuffs, volcanic ashes and pumicites, and calcined clays and shales.

The chemical and physical attributes of Class C, Class F and Class N pozzolanic ashes are further defined by ASTM C618, the content of which is hereby incorporated by reference in its entirety.

It is known to use fly ash in cement compositions, typically in the presence of Portland cement. U.S. Pat. No. 5,556,458 to Brook, et al., for example, requires at least 20% Portland cement. In particular, Brook, et al. notes that Portland cement is required in their composition to overcome the low early strength of fly ash compositions.

U.S. Pat. No. 4,997,484 to Gravitt et al. and U.S. Pat. No. 7,288,148 to Hicks et al. disclose fly ash cement compositions without Portland cement, but rely on an acid-base reaction system that utilizes the combined effects of citric acid (≈pH 2.2) and either an alkali hydroxide (≈pH 12-14) or metal carbonate (≈pH 11.6). However, the fly ash cement compositions of Gravitt and Hicks do not exhibit the plastic properties, strength and hardness required by many cement applications.

U.S. Pat. No. 8,016,937 to Schumacher, the entirety of which is incorporated herein by reference, describes improved cementitious compositions comprising pozzolan powders and pH neutral reactants, and in particular, pH neutral citric salts.

U.S. Pat. No. 8,349,072 to Schumacher, the entirety of which is incorporated herein by reference, describes improved cementitious compositions comprising pozzolan powders and pH neutral reactants, and in particular, pH neutral lactate salts.

Similarly U.S. Pat. No. 8,747,548 to Schumacher, the entirety of which is incorporated herein by reference, describes improved cementitious compositions comprising pozzolan powders and pH neutral reactants, and in particular, pH neutral lactate salts with retarders based on boron compounds.

Despite the above advances the need remains for new cementitious compositions which exhibit desirable properties.

The reference in this specification to any prior publication (or information derived from it), or to any matter which is known, is not, and should not be taken as an acknowledgement or admission or any form of suggestion that the prior publication (or information derived from it) or known matter forms part of the common general knowledge in the field of endeavour to which this specification relates.

SUMMARY

The present disclosure is based on the discovery that cementitous compositions comprising one or more corrosion inhibiting boron containing compounds, one or more alpha-hydroxy acid and/or polycarboxylic acid hydration accelerators, one or more hydration retarders and one or more alkali metal hydroxide or carbonate modifiers, mitigate the potential for iron and steel to corrode when embedded therein. Further benefits of the compositions of the present disclosure may include the ability to mitigate or control ferrous or ferric oxidation (corrosion) by providing a passivating layer to exposed steel or iron within the cementitious composition.

In one aspect the present disclosure provides a reagent mixture for a cement composition or cementitious composition comprising:
  (a) one or more hydration accelerators selected from alpha-hydroxy carboxylic acids, polycarboxylic acids or combinations thereof;
  (b) one or more alkali metal hydroxide or carbonate modifiers;
  (c) one or more corrosion inhibiting boron containing compounds; and
  (d) one or more non-boron containing hydration retarders.

When used as a hydration reactant composition in self-cementing pozzolanic cements, the reagent mixture surprisingly improves the cements' plastic properties such as time of set, slump retention and workability. This improved slump retention and workability allows workers to conduct surface finishing operations to obtain desired textures without the time constraints associated with the use of citric salt reactants or reactants employing the salts of other higher chain length carboxylic acids. Interestingly, not all carboxylic acids produce the advantage of polycarboxylic acids or alpha-hydroxy carboxylic acids. In particular the use of a monocarboxylic acid, such as propionic acid, was found not to produce the improvements in retention and workability characterized by the reagent mixtures of the present disclosure.

In some embodiments the polycarboxylic acid is selected from the group consisting of malic acid, citric acid and malonic acid.

In some embodiments the alpha-hydroxy carboxylic acid is selected from the group consisting of lactic acid and glycolic acid.

A preferred alpha-hydroxy carboxylic acid is lactic acid.

The alkali metal hydroxide or carbonate may be selected from potassium hydroxide, sodium hydroxide, lithium hydroxide, potassium carbonate, sodium carbonate, lithium carbonate, potassium bicarbonate, sodium bicarbonate, or lithium bicarbonate and combinations thereof.

Preferred alkali metal hydroxides include sodium, potassium and lithium hydroxide.

In some embodiments the boron containing compound is selected from boric acid and boron oxyanions and combinations thereof.

The boron containing compound may be selected from borax, boric acid, borates such as potassium borate or sodium borate, and tetraborates, such as potassium tetraborate or sodium tetraborate or combinations thereof.

The non-boron containing retarder may be selected from aluminum sulphate, phosphonic acid compounds, phosphonates, gluco-heptonates, organic based retarders and combinations thereof. Other non-boron containing retarders known in the art are also contemplated.

In some embodiments the reagent mixture may be substantially free of citric acid salt activators, lactic acid salt activators or other pH neutral salt activators, either aqueous or solid. By substantially free it may be meant that the amount of salt relative to the amount of acid is less than 1% by weight.

In some embodiments the reagent mixture comprises:
(a) up to about 80% by weight of one or more polycarboxylic acids, alpha-hydroxy carboxylic acids or combinations thereof;
(b) up to about 40% by weight of one or more alkali metal hydroxides or carbonates;
(c) up to about 20% by weight of one or more corrosion inhibiting boron containing compounds; and
(d) up to about 50% by weight of one or more non-boron containing retarders.

In some embodiments the reagent mixture comprises:
(a) up to about 70% by weight of one or more polycarboxylic acids, alpha-hydroxy carboxylic acids or combinations thereof;
(b) up to about 40% by weight of one or more alkali metal hydroxides or carbonates;
(c) up to about 10% by weight of one or more corrosion inhibiting boron containing compounds; and
(d) up to about 40% by weight of one or more non-boron containing retarders.

In some embodiments the reagent mixture comprises:
(a) 30-70% by weight of one or more polycarboxylic acids, alpha-hydroxy carboxylic acids or combinations thereof;
(b) 10-40% by weight of one or more alkali metal hydroxides or carbonates;
(c) up to about 10% by weight of one or more corrosion inhibiting boron containing compounds; and
(d) 0.5 to 40% by weight of one or more non-boron containing retarders.

Other modifiers may be present in the reagent mixture, provided that an alkali metal hydroxide or carbonate is present in a concentration of greater than 40% by weight of the total modifier content of the cement composition. Stated alternatively, non-alkali metal containing modifiers should be present in a total amount of less than 40% by weight, preferably less than 20% by weight, and more preferably less than 15% by weight, of the total weight of all combined modifiers in the cement composition.

In another aspect the present disclosure provides a hydratable cement composition comprising a reagent mixture as herein disclosed.

In another aspect the present disclosure provides a hydratable cement composition comprising:
(a) one or more hydration accelerators selected from polycarboxylic acids, alpha-hydroxy carboxylic acids or combinations thereof;
(b) one or more alkali metal hydroxide or carbonate modifiers;
(c) one or more corrosion inhibiting boron containing compounds;
(d) one or more self-cementing pozzolans;
(e) one or more Portland cements;
(f) one or more non-boron containing hydration retarders; and
(g) optionally, one or more beneficiating agents.

The hydratable cement composition may comprise:
(a) up to about 8.0% by weight of one or more polycarboxylic acids, alpha-hydroxy carboxylic acids or combinations thereof;
(b) up to about 9.0% by weight of one or more alkali metal hydroxides or carbonates;
(c) up to about 5.0% by weight of one or more corrosion inhibiting boron containing compounds;
(d) between about 48% and about 93.5% by weight of one or more self-cementing pozzolans;
(e) between about 1.5% and about 45% by weight of one or more Portland cements;
(f) up to about 4.0% by weight of one or more non-boron containing retarders; and
(g) optionally, up to about 20% by weight of one or more beneficiating agents.

The cement composition may contain up to about 4.0% by weight of one or more corrosion inhibiting boron containing compounds, or up to about 3.5% by weight, or up to about 3.0% by weight, or up to about 2.5% by weight, or up to about 2.0% by weight, or up to about 1.5% by weight, or up to about 1.0% by weight, or up to about 0.5% by weight, or up to about 0.4% by weight, or up to about 0.3% by weight.

In some embodiments the hydratable cement composition may comprise:
(a) up to about 8.0% by weight of one or more polycarboxylic acids, alpha-hydroxy carboxylic acids or combinations thereof;
(b) up to about 5.0% by weight of one or more alkali metal hydroxides or carbonates;

(c) up to about 1.0% by weight of one or more corrosion inhibiting boron containing compounds;
(d) between about 48% and about 93.5% by weight of one or more self-cementing pozzolans;
(e) between about 1.5% and about 45% by weight of one or more Portland cements;
(f) up to about 4.0% by weight of one or more non-boron containing retarders; and
(g) optionally, up to about 20% by weight of one or more beneficiating agents.

In some embodiments the hydratable cement composition may comprise:
(a) up to about 8.0% by weight of one or more polycarboxylic acids, alpha-hydroxy carboxylic acids or combinations thereof;
(b) up to about 5.0% by weight of one or more alkali metal hydroxides or carbonates;
(c) up to about 0.5% by weight of one or more corrosion inhibiting boron containing compounds;
(d) between about 48% and about 93.5% by weight of one or more self-cementing pozzolans;
(e) between about 1.5% and about 45% by weight of one or more Portland cements;
(f) up to about 4.0% by weight of one or more non-boron containing retarders; and
(g) optionally, up to about 20% by weight of one or more beneficiating agents.

In any one of the herein disclosed embodiments the Portland cement is present in the hydratable cement composition in an amount from about 1.5 to about 45 weight percent of the total hydratable cement, or present in an amount from about 1.5 to about 20 weight percent, or present in an amount from about 1.5 to about 3.5 weight percent.

In any one of the herein disclosed embodiments the Portland cement is present in the hydratable cement composition in an amount from about 1.5 to about 10 weight percent, or about 2.0 to about 10 weight percent, or about 2.5 to about 10 weight percent, or about 3.5 to about 10 weight percent, or about 4.0 to about 10 weight percent.

Preferably the Portland cement is present in the hydratable cement composition in an amount from about 1.5 to about 3.5 weight percent.

In some embodiments the polycarboxylic acid is selected from the group consisting of malic acid, citric acid and malonic acid.

In some embodiments the alpha-hydroxy carboxylic acid is selected from the group consisting of lactic acid and glycolic acid.

A preferred alpha-hydroxy carboxylic acid is lactic acid.

In some embodiments the hydratable cement composition may be substantially free of citric acid salt activators, lactic acid salt activators or other pH neutral salt activators, either aqueous or solid. By substantially free it may be meant that the amount of salt relative to the amount of acid is less than 1% by weight.

The alkali metal hydroxide or carbonate may be selected from potassium hydroxide, sodium hydroxide, lithium hydroxide, potassium carbonate, sodium carbonate, lithium carbonate, potassium bicarbonate, sodium bicarbonate, or lithium bicarbonate and combinations thereof.

Preferred alkali metal hydroxides include sodium, potassium and lithium hydroxide.

In some embodiments the boron containing compound is selected from boric acid and boron oxyanions and combinations thereof.

The boron containing compound may be selected from borax, boric acid, borates, such as potassium borate and sodium borate, and tetraborates such as potassium tetraborate and sodium tetraborate and combinations thereof.

The non-boron containing retarder may be selected from aluminum sulphate, phosphonic acid compounds, phosphonates, gluco-heptonates, organic based retarders and combinations thereof. Other non-boron containing retarders known in the art are also contemplated.

The self-cementing pozzolan is preferably coal based Class C fly ash.

According to another embodiment, the self-cementing pozzolan consists essentially of calcium bearing pozzolan wherein the calcium bearing pozzolan is present in an amount of 60-93.5 weight percent, based on the total weight of the hydratable cement. More preferably the calcium bearing pozzolan is present in an amount of 85-93.5 weight percent, based on the total weight of the hydratable cement.

According to another embodiment, the hydratable cement may further comprise a calcium-rich material additive, preferably an industrial byproduct selected from the group consisting of cement kiln dust, lime kiln dust, furnace slag, scrubber ash, and combinations thereof.

According to another embodiment, the self-cementing pozzolan consists essentially of 100% Class C fly ash.

According to another embodiment, the self-cementing pozzolan consists essentially of 100% of an industrial by-product from waste to energy facilities.

According to another embodiment, the hydratable cement may comprise 70 to 93.5 weight percent Class C fly ash based on the total weight of the hydratable cement.

According to another embodiment, the hydratable cement may further comprise 0.1 to 30 weight percent Class F fly ash based on the total weight of the hydratable cement.

According to another embodiment, the hydratable cement may further comprise 0.1 to 30 weight percent Class N pozzolanic ash based on the total weight of the hydratable cement.

According to another embodiment, the retarder comprises aluminum sulphate, preferably in an amount of 0.1 to 5.0 weight percent, based on the total weight of hydratable cement.

According to another embodiment, the hydratable cement comprises phosphonic acid salts or organic compounds.

According to another embodiment, the hydratable cement comprises lactic acid, preferably in an amount of 0.1 to 15 weight percent based on the total weight of the hydratable cement.

According to another embodiment, the hydratable cement may further comprise a property modifying additive selected from the group consisting of silica fume, calcium aluminate, magnesium oxide, lime, reactive clays such as meta-kaolin, wollastonite, air entraining agents (AEA), latex, fibers, viscosity modifying agents (VMA), shrinkage compensating agents (SRA), plasticizers and combinations thereof.

The self-cementing pozzolan may further comprise Ground Granulated Blast Furnace Slag (GGBFS).

The hydratable cement composition may have a calcium content expressed as the oxides of 20% or more based on the total weight of the cement composition.

The hydratable cement composition may have a silica to calcia molar ratio of between about 0.95:1 and about 1.7:1.

The self-cementing pozzolan may be produced at temperatures in excess of 2300° Fahrenheit (1260° Celcius).

The self-cementing pozzolan may have a lime content of at least 24% by weight and the lime may be provided by the pozzolan.

The cement composition may have a set time of between 10 minutes and 20 hours.

The beneficiating agent may be selected from the group consisting of calcium hydroxide, calcium oxide, calcium acetate, and calcium lactate, or combinations thereof.

The beneficiating agent may further comprise wollastonite, calcium aluminates, silica fume, rice hull ash, class N pozzolan, or combinations thereof.

The hydratable cement composition of the present disclosure may further comprise any source of pozzolanic material, whether naturally occurring or man-made, including rice hull ash, volcanic ash, pumacite, opal and other shales, diatomaceous earths, opaline cherts, tuffs, calcined clays, coal based class C fly-ash, either alone or in combination.

The cement may further comprise other additives, including silica fume, calcium aluminate, magnesium oxide, reactive clays such as meta-kaolin, wollastonite, air entraining agents (AEA), latex, fibers (for fracture toughness), shrinkage compensation additives, and water reducers.

The presently disclosed cements may be used alone or blended with other cements such as slag cements, and other types of hydraulic cements. However, the cements of the present disclosure do not require the presence of other cements in order to exhibit their superior properties.

Aluminum sulphate may be used as a retarder to prevent or delay the time of set. Aluminum sulphate may be present in the range of 0.5 to 40% by weight, or preferably 0.5 to 10% by weight, or more preferably from 0.5 to about 5% by weight, based on the total weight of the cement composition.

Alternatively or additionally, phosphonic acid compounds may be used as a retarder to prevent or delay the time of set. Phosphonic acid compounds may be present in the range of 0.5 to 10% by weight, or preferably 0.5 to 5% by weight, or more preferably from 0.5 to about 3% by weight based on the total weight of the cement composition.

There is also provided an reagent mixture comprising one or more polycarboxylic acids, alpha-hydroxy carboxylic acids or combinations thereof, one or more alkali metal hydroxides or carbonates, one or more corrosion inhibiting boron containing compounds, and one or more non-boron containing hydration retarders, wherein the boron compound is pre-dissolved in the reagent mixture in concentrations from 20.0% to 50.0%, or more preferably in concentrations from 40.0% to 50.0% by weight.

According to another embodiment, the reagent mixture comprises lactic acid, an alkali metal hydroxide or carbonate, one or more corrosion inhibiting boron containing compounds and one or more non-boron containing hydration retarders, wherein the retarder is pre-dissolved in the reactants in concentrations from 39.1% to 50.0%, or more preferably in concentrations from 40.1% to 50% by weight.

According to another embodiment the non-boron containing hydration retarders and/or other compounds may be in solution in other solvents at concentrations from 0.1% to 50% by weight.

In some embodiments, the hydratable cement composition comprises: a self-cementing pozzolan, a Portland cement, one or more polycarboxylic acid and/or alpha-hydroxy carboxylic acid accelerators, an alkali metal hydroxide or carbonate, one or more corrosion inhibiting boron containing compounds and one or more non-boron containing hydration retarders, wherein the hydratable cement has a calcium content expressed as the oxides of 20% or more based on the total weight of the hydratable cement, and wherein the reactants account for greater that 50% of the total weight of reactants in said hydratable cement and wherein the hydratable cement has between 1.5 and about 45% by weight Portland cement based on the total weight of the hydratable cement.

According to another embodiment, the hydratable cement comprises lactic acid, wherein said lactic acid comprises greater than 95% of the total weight of the accelerators in said hydratable cement.

According to another embodiment, the hydratable cement comprises: a self-cementing pozzolan, a Portland cement, two or more accelerators selected from polycarboxylic acid and/or alpha-hydroxy carboxylic acid, at least one of which is a lactic acid; an alkali metal hydroxide or carbonate, a boron containing corrosion inhibiting compound and one or more non-boron containing hydration retarders, wherein the hydratable cement has a calcium content expressed as the oxides of 20 wt. % or more based on the total weight of the hydratable cement, and wherein said lactic acid accelerator accounts for greater than 50% of the total weight of accelerators in said hydratable cement.

According to other embodiments, the cementitious composition comprises a hydratable cement comprising: a self-cementing pozzolan, a Portland cement, lactic acid accelerator, an alkali metal hydroxide or carbonate, a boron containing corrosion inhibiting compound, a non-boron containing hydration retarder, and one or more aggregate fillers, wherein the hydratable cement has a calcium content expressed as the oxides of 20 wt. % or more based on the total hydratable cement, and wherein the lactic acid accelerator accounts for greater than 50% of the total weight of the accelerators in said hydratable cement and wherein the hydratable cement comprises between 1.5 and about 45% by weight by weight of Portland cement based on the total weight of the cement composition.

According to another embodiment, the hydratable cement composition may comprise Portland cement in amounts between 1.5 and 10% by weight, and more preferably between 1.5 and 5% by weight, and even more preferably between 1.5 and 3.5% by weight, based on the total weight of the cement composition.

According to other embodiments, the hydratable cement composition may comprise an alkali metal hydroxide or alkali metal carbonate compound in amounts of less than 30% by weight, and more preferably less than 25% by weight, of the total weight of reagent mixture components in said hydratable cement.

According to other embodiments, the hydratable cement composition may comprise alkali metal hydroxide or carbonate in amounts less than 20% by weight, or less than 15% by weight, or less than 10% by weight, or less than 5% by weight, or less than 2% by weight, based on the total weight of reagent mixture components in said hydratable cement.

According to other embodiments, the hydratable cement may comprise alkaline earths in amounts less than 10% by weight, less than 5% by weight, less than 1% by weight, based on the total weight of reagent mixture components in said hydratable cement.

According to other embodiments, the hydratable cement may comprise lactic acid in an amount of less than 30% by weight, and more preferably less than 25% by weight, of the total weight of reagent mixture components in said hydratable cement.

According to other embodiments, the hydratable cement may comprise lactic acid in amounts less than 20% by weight, less than 15% by weight, less than 10% by weight, less than 5% by weight, and less than 2% by weight, based on the total weight of reagent mixture components in said hydratable cement.

In another aspect of the present disclosure there is provided a mortar, grout, or concrete comprising a hydratable cement composition as disclosed herein.

In another aspect of the present disclosure there is provided a cementitious composition comprising the hydratable cement composition as disclosed herein.

The cementitious compositions may further comprise one or more fillers in addition to the cement. Such fillers may comprise Class F fly-ash or Class N pozzolanic ash. Other fillers may be used, such as fine aggregate, for example, sand.

Cementitious compositions according to the present disclosure are characterized by corrosion mitigation, unexpectedly high dimensional stability, strength, hardness, controlled working times, permeability, sulphate resistance, freeze-thaw resistance, mitigation of alkali-aggregate reactivity, and/or an easily controlled, wide range of setting times.

In another aspect there is provided a concrete composition comprising a hydratable cement composition as herein disclosed.

In some embodiments the concrete composition passes less than 4000 Coulombs of charge after 90 days cure, when tested in accordance with ASTM C1202.

In some embodiments the concrete composition passes less than 3500 Coulombs of charge after 90 days cure, or less than 3000 Coulombs of charge, or less than 2500 Coulombs of charge, or less than 2000 Coulombs of charge, or less than 1500 Coulombs of charge, or less than 1000 Coulombs of charge after 90 Days cure, when tested in accordance with ASTM C1202.

In some embodiments the concrete composition passes less than 3500 Coulombs of charge after 14 days cure, or less than 3000 Coulombs of charge, or less than 2500 Coulombs of charge, or less than 2000 Coulombs of charge, or less than 1500 Coulombs of charge, or less than 1000 Coulombs of charge after 14 Days cure, when tested in accordance with ASTM C1202.

In some embodiments the concrete composition passes less than 3500 Coulombs of charge after 28 days cure, or less than 3000 Coulombs of charge, or less than 2500 Coulombs of charge, or less than 2000 Coulombs of charge, or less than 1500 Coulombs of charge, or less than 1000 Coulombs of charge after 28 Days cure, when tested in accordance with ASTM C1202.

In some embodiments the concrete composition passes less than 3500 Coulombs of charge after 56 days cure, or less than 3000 Coulombs of charge, or less than 2500 Coulombs of charge, or less than 2000 Coulombs of charge, or less than 1500 Coulombs of charge, or less than 1000 Coulombs of charge after 56 Days cure, when tested in accordance with ASTM C1202.

According to another embodiment, the cementitious composition comprises a hydratable cement comprising; a self-cementing pozzolan, a Portland cement, two or more accelerators, at least one of which is a lactic acid, an alkali metal hydroxide or carbonate, a boron containing corrosion inhibiting compound, and a non-boron containing hydration retarder, wherein the hydratable cement has a calcium content expressed as the oxides of 20 wt. % or more based on the total weight of the hydratable cement, and wherein said lactic acid accelerator accounts for greater than 50% of the total accelerators in said cement; and one or more aggregate fillers. The aggregate fillers may be selected from the group consisting of silica sand, natural sand, manufactured fine aggregate from stone production, bottom ash, slag, ground glass, recycled foundry sand, recycled concrete and combinations thereof. The cementitious composition may have a set time of between 30 minutes and 16 hours, or it may be greater than 16 hours without deleteriously affecting the ultimate performance properties, e.g. mechanical properties.

According to another aspect there is provided an article of manufacture comprising a hydrated and hardened cement composition as disclosed herein.

According to one embodiment, the article of manufacture comprises a hydrated and hardened cement composition comprising a self-cementing pozzolan, a Portland cement, two or more accelerators, at least one of which is a lactic acid accelerator, an alkali metal hydroxide or carbonate, a boron containing corrosion inhibiting compound, and a non-boron containing hydration retarder, wherein the hydratable cement has a calcium content expressed as the oxide of 20 wt. % or more based on the total weight of the hydratable cement; and wherein said lactic acid accelerator accounts for greater than 50% of the total weight of accelerators in said hydratable cement.

According to one embodiment, the article of manufacture comprises a hydrated and hardened cement composition comprising a self-cementing pozzolan, a Portland cement, a lactic acid accelerator, an alkali metal hydroxide or carbonate, a boron containing corrosion inhibiting compound, and a non-boron containing hydration retarder, wherein the hydratable cement has a calcium content expressed as the oxide of 20 wt. % or more based on the total weight of the hydratable cement; and wherein said lactic accelerator accounts for greater than 50% of the total weight of accelerators in said hydratable cement and wherein the hydratable cement has between 1.5 and 20% by weight Portland cement based on the total weight of the hydratable cement.

DETAILED DESCRIPTION OF THE EMBODIMENTS

The following is a detailed description of the disclosure provided to aid those skilled in the art in practicing the present disclosure. Those of ordinary skill in the art may make modifications and variations in the embodiments described herein without departing from the spirit or scope of the present disclosure.

Although any methods and materials similar or equivalent to those described herein can also be used in the practice or testing of the present disclosure, the preferred methods and materials are now described.

It must also be noted that, as used in the specification and the appended claims, the singular forms 'a', 'an' and 'the' include plural referents unless otherwise specified. Thus, for example, reference to 'retarder' may include more than one retarders, and the like.

Throughout this specification, use of the terms 'comprises' or 'comprising' or grammatical variations thereon shall be taken to specify the presence of stated features, integers, steps or components but does not preclude the presence or addition of one or more other features, integers, steps, components or groups thereof not specifically mentioned.

Unless specifically stated or obvious from context, as used herein, the term "about" is understood as within a range of normal tolerance in the art, for example within two standard deviations of the mean. 'About' can be understood as within 10%, 9%, 8%, 7%, 6%, 5%, 4%, 3%, 2%, 1%, 0.5%, 0.1%, 0.05%, or 0.01% of the stated value. Unless otherwise clear from context, all numerical values provided herein in the specification and the claim can be modified by the term 'about'.

Any processes provided herein can be combined with one or more of any of the other processes provided herein.

Ranges provided herein are understood to be shorthand for all of the values within the range. For example, a range of 1 to 50 is understood to include any number, combination of numbers, or sub-range from the group consisting 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50.

Disclosed herein are advantageous reagent compositions for cementitious compositions and cementitious compositions derived therefrom.

Prior to the present disclosure, hydraulic cements such as Portland cement were found to be susceptible to corrosion of iron or steel that was embedded within it. Under ideal conditions the alkalinity of the composition will protect any iron from corrosion by maintaining a high pH.

However, when Portland and other hydraulic cements are exposed to sources of chloride ions, this protection is negated. Due to the high permeability and moisture contents of Portland cement based concrete, diffusion of the chloride ion can transport through the matrix eventually locating and reacting with iron and steel thus forming expansive corrosion products (rust).

The basic reactions are $$Fe \rightarrow Fe^{2+} + 2e^-$$

The following redox reaction also occurs in the presence of water and is crucial to the formation of rust:

$$4Fe^{2+}O_2 \rightarrow 4Fe^{3+} + 2O^{2-}$$

In addition, the following multistep acid base reactions affect the course of rust formation:

$$Fe^{2+} + 2H_2O \rightleftharpoons Fe(OH)_2 + 2H^+$$

$$Fe^{3+} + 3H_2O \rightleftharpoons Fe(OH)_3 + 3H^+$$

$$Fe^{2+} + OH \rightleftharpoons Fe(OH)2$$

$$4Fe(OH)_2 + O_2 \rightleftharpoons 2Fe_2O_3 * H_2O + 2H_2O$$

It is the formation of these compounds that lead to initial rust formation and provides a continuing supply of reactants to facilitate further rust formation. The end product $Fe_2O_3$ is expansive and causes distress in the concrete matrix resulting in cracking.

Without wishing to be bound by theory the present disclosure makes use of borate ions which are formed when boron containing compounds dissolve. These borate ions form $FeBO_3$ complexes which bind to the surface of the iron minimizing the ability of oxygen to react with fresh iron. In other instances the boron ions may act as oxygen scavengers to once again prevent them from coming in contact with iron surfaces.

Prior to the present disclosure, it was generally believed that high temperature sintering (in the case of Portland cement) or strong acid-base chemistry (in the case of prior art pozzolanic cements) was necessary to provide the strength and hardness required by most cement applications. Subsequent to this prevailing view, the present inventor discovered that by using a polycarboxylic acid and, in particular, a hydroxyl carboxylic acid, for example lactic acid, a weak acid with a Ka of about $1.4*10^{-4}$, and an alkali metal hydroxide or carbonate, cement products can be produced that have unexpectedly superior properties compared to Portland cement or to other pozzolanic cements prepared according to traditional acid-base reactions or pH neutral salt chemistries.

It was further discovered that the increased density of the cement of the present disclosure combined with the presence of boron compounds reduces the potential for corrosion product formation. This alleviates the need for coatings on the steels used for reinforcement or otherwise embedded within a concrete or mortar matrix.

Subsequent to the discovery of the advantages of citric salts as reactants, the present inventor discovered that polycarboxylic acids and, in particular, hydroxyl carboxylic acids, for example lactic acid, when used as a hydration reactant of pozzolan cements, surprisingly improve the cements' plastic properties such as slump retention and workability. The improved slump retention and workability allows workers to conduct surface finishing operations to obtain desired textures without the time constraints associated with the use of citric salt reactants or reactants employing the salts of other longer chain carboxylic acids. The present inventor further discovered that by not using salts of citric or lactic acids plastic properties were more easily controlled to provide superior performance in the end products. Interestingly, it was also found that not all three-carbon carboxylic acids produce the advantage of polycarboxylic acids and hydroxyl carboxylic acids. In particular, propionic acid, a three-carbon carboxylic acid, was found not to produce the improvements in retention and workability characterized by the present cements.

Described herein are cement compositions in which polycarboxylic acids and/or hydroxyl carboxylic acids together with alkali metal hydroxide or carbonate are used as hydration reactants to produce improved plastic properties such as slump retention and workability. The acid reactant may dissolve or digest the silica or silico-alumina bonds of the self-cementing pozzolans to allow the hydration reactions and polymerizations with the pozzolans to proceed in a uniform, well controlled manner. Aluminum sulfate or phosphonic acid compounds, or other conventional retarders, may be used in the compositions to slow or modify the hydration reaction. Where citric salt reactants allow for set times in ranges from as little as 10 minutes to 2 hours or more, the polycarboxylic acids and/or alpha-hydroxy carboxylic acids of the present disclosure allow for set times in the range of 30 minutes to 16 hours or more without significant loss in plastic properties.

A method of determining the plastic condition of concrete is ASTM C143 Test method for Slump of Hydraulic Cement Concrete. Slump is a measure of consistency of concrete and often is used as an indication of the water quantity in the plastic concrete. With Portland cement and others, water is consumed during the transportation process, thereby reducing the slump. Contractors often will add water on site to re-obtain the original or desired slump. This results in decreased strengths. With the compositions of the present disclosure this does not occur so strength is not affected.

Embodiments of this disclosure may also include combinations of pozzolanic materials, for example, both Class C and Class F fly ash. The reaction of Class C fly ash can produce considerable heat, and this heat can cause early-stage expansion as the product initially hardens. This expansion can result in a volume increase prior to setting which may lead to subsequent cracking and delamination from a substrate. Class F fly ash contains little or no calcium oxide (CaO), and is slowly reactive with the polycarboxylic acids or alpha-hydroxy carboxylic acid such as lactic acid and alkali metal hydroxides or carbonates. Accordingly, the inclusion of some Class F fly ash in the reaction mixture moderates the reactions forming the solid product by uniformly distributing strong, uniformly sized slow reacting glass microspheres throughout the mixture. Additionally, these thermal reactions are regulated by the use of the polycarboxylic acid or alpha-hydroxy carboxylic acid such as lactic acid. The method by which this is accomplished is by controlling the early conversion rate to the hydrated compounds. Consequently while the total heat generated is the same, the time to achieve the hydration is broadened which allows heat dissipation to the environment in a more controlled manner As with cements activated with citric salts, the cement materials activated with polycarboxylic acids or hydroxyl carboxylic acid such as lactic acid and alkali metal hydroxide or carbonate, upon reaction with water, preferably include hydrates having silica (S) to calcia (C) molar ratios (S:C) of from about 0.95:1 to about 1.8:1, typically from about 1.1:1 to about 1.5:1. As particular examples, the S:C ratio may be about 1.2:1, 1.3:1 or 1.4:1. The relative amounts of calcium-containing pozzolans such as industrial by-products (e.g., Class C fly ash) and low-calcium or siliceous industrial by-products (e.g., Class F fly ash) may be selected in order to achieve the desired S:C molar ratio.

The cements according to the present disclosure may include the materials as herein disclosed, in amounts expressed in terms of weight percentage of the entire cement composition, not including sand, stone and other fillers. The term "cement" is generally used herein to refer to the binder composition. The term "cementitious composition" is generally used herein to refer to the combination of the cement (or binder) and filler, for example sand, stone, and the like. The cementitious composition typically includes from about 5 percent to about 60 percent cement.

The cements of the present disclosure include natural or industrial pozzolans. Examples of pozzolans include coal derived class C fly ash, non-coal derived class C fly ash, class F fly ash, and class N pozzolanic ash. The cementitious compounds may include class C fly ash as a high calcium-containing pozzolan. In some embodiments, class C fly ash may be included in the cement in the range of about 50 to about 93.5 weight percent, within the range of about 60 to about 93.5 weight percent, or within the range of about 70 to about 93.5 weight percent. Preferably, the calcium content, expressed as the oxides (CaO), of the high calcium containing pozzolan is higher than about 22 weight percent and is in the range of about 22 to about 30 weight percent. If the CaO content is low, additional lime bearing components such as calcium hydroxide, nitrates, nitrites, sulfates or carbonates may be added. Note that although the use of class C fly ash as the high calcium-containing pozzolan is primarily described herein, other types of calcium-containing pozzolans may be used in some embodiments as partial substitutes for the class C fly ash (for example, blast furnace slag, WTE fly ash, cement kiln dust, and lime kiln dust).

The Portland cement used in the present compositions may be of any type such as Type I, Type II, Type III or others. The Portland cement is present in an amount of 1.5 to about 45 weight percent of the total hydratable cement, or present in an amount of 1.5 to about 20 weight percent, or present in an amount of 1.5 to about 3.5 weight percent.

The cement may additionally include one or more relatively low calcium or high silicon containing pozzolans. In some embodiments, the cement includes at least one pozzolan with a calcium content expressed as the oxides of less than about 22 weight percent or, more preferably, less than about 15 weight percent. In some embodiments, class F fly ash may, for example, be present in the range of about 0.5 to about 30 weight percent, or preferably within the range of about 1 to about 25 weight percent, or more preferably within the range of about 0.1 to about 15 weight percent. Although the use of class F fly ash as the low-calcium pozzolan is primarily described herein, other types of relatively low calcium and/or high silicon pozzolans may be used in some embodiments as partial or total substitutes for the Class F fly ash (for example, Class N pozzolanic ash, volcanic ash, bottom ash, wood ash, WTE ash, municipal incinerator ash, zeolites etc.).

Silica fume may be used in the cement to increase short term strength, long term strength, bond strength, elastic properties, chemical resistance, and/or thermal properties. When present, silica fume may be present, for example, in the range of about 0.1 to about 10 weight percent, or preferably within the range of about 1 to about 7 weight percent.

Preferably, the cement comprises a total calcium content expressed as the oxides of 20 weight percent or more. If the CaO content is low, additional lime bearing components such as, but not limited to, calcium hydroxide, nitrate, nitrite, sulfate or carbonate may be added to achieve this calcium content.

Calcium aluminate may be used to increase the short-term strength development of the product or in other instances it may provide dimensional stability. Calcium aluminate may, for example, be present in the range of about 1 to about 25 weight percent, or within the range of about 5 to about 20 weight percent.

Lime (CaO or $Ca(OH)_2$) additions can be used to enhance product workability, act as a shrinkage compensator, and/or function as an accelerator. Lime may, for example, be present in the range of about 0.1 to about 5 weight percent. The amount of lime added to the composition may be dependent upon the amount of lime present in the fly ash.

Miscellaneous ingredients including, for example, reactive clays such as meta-kaolin, wollastonite, air entraining agents (AEA), latex, fibers (for fracture toughness), shrinkage compensators (SRA), viscosity modifying agent (VMA) and plasticizers may also be present in the cement composition of the present disclosure.

In some embodiments the cement of the present disclosure may require a special concrete admixture to entrain air in the paste. Air entrainment is a vital property when the cement is used in service where it may be possible to become critically saturated with water and experience freezing and thawing conditions. This entrained air may provide relief to the harmful effects of volume change due to the expansion or contraction of the freezing of water. Other applications may require the air entrainment to lower the density of the hydrated cement to provide buoyancy or drainage in certain cases. When this property is required the air entrainment agents may be comprised of synthetic foaming agents such as dodecyl benzyl sulphonates or sodium laurel/laureth sulphates. In some cases, proteinecious agents such as Merlefoam from US Cellular may be used. Other agents that have compatibility may also be used.

In some embodiments, the cements of the present disclosure are substantially free of other types of conventional cements such as calcium aluminate cements or magnesium phosphate cements.

By substantially free it is meant that the other types of conventional cements are present in an amount less than 1 wt. % based on the total weight of the cement.

In other embodiments such other cements may comprise less than about 20 weight percent, preferably less than about 15 weight percent, and more preferably less than 5 weight percent, of the total weight of the cement.

Cementitious compositions according to the disclosure may include one or more fillers in addition to the cement. According to some embodiments, fine aggregate (sand) particle sizes can range from fine silica sand to naturally or manufactured sand to conform to ASTM specifications. These fillers may include, for example, silica sand, natural sand, manufactured fine aggregate from stone production, bottom ash, slag, ground glass, recycled concrete and/or recycled foundry sands. Specific examples of fillers include different aggregate gradations, such as those conforming with ASTM specifications, for example C33 sand, C144 sand, NJ-60 sand, #8 stone, and #57 stone or others.

Reference will now be made to exemplary embodiments of the disclosure. While the disclosure will be described in conjunction with the exemplary embodiments, it will be understood that it is not intended to limit the disclosure to those embodiments. To the contrary, it is intended to cover alternatives, modifications, and equivalents as may be included within the spirit and scope of the disclosure as defined by the appended claims.

EXAMPLES

Example 1

Table 1 illustrates the effect of varying the proportion of reagent mixture components in a mortar mixed and cured at 22° C. The mortars were prepared with the approximate proportions of cement, 3.1 kg (including reagent mixture components), C33 Natural Sand, 4.9 kg, and water, 0.7 kg. The mortar was mixed for 4 minutes in a 28 liter mixer and samples made for testing. The mortars had the approximate composition (not including water):

| | |
|---|---|
| Class C fly ash | ~30-36 wt. % |
| Portland cement | ~1-2 wt. % |
| Corrosion inhibitor | ~0.1% to 0.9% |
| Retarder | ~0.3 to 2.0 wt. % |
| Modifier | ~0.95 to 3.20 wt. % |
| Accelerator | ~2.20 to 7.00 wt. % |
| C33 Sand | ~59-63 wt. % |
| Total | 100.00 wt. % |

Lactic acid accelerator was produced by Galactic Inc. of Milwaukee, Wis. and used as 88% solids. Sodium hydroxide modifier was from Dow Chemical Company, Freeport, Tex. and prepared as a 50% solution. The retarder, aluminum sulfate, was produced by General Chemical Co., Parsippany, N.J. The retarder was co-dissolved in the sodium hydroxide solution. Other suppliers for these components of equal quality can be found globally and may be substituted. The corrosion inhibitor used was boric acid from US Borax.

Examples of the ability of these lactic acid mixtures to retain slump or flow can be seen in Table 1. The weight percents shown are based upon the amount of class C fly ash in the mixture. In Table 1 the effect of the retarder compound to the retention of working time in mortars and concrete is determined in accordance with ASTM C403 as shown. Variations to the lactic acid accelerator, sodium hydroxide and aluminum sulphate retarder were evaluated to determine what effect, if any, to the slump or flow retention would occur. From this, it is possible to formulate the cement to achieve specific properties.

TABLE 1

| | Weight % | | | | Flow Retention time (min) | Final Set time (mins) | Compressive Strength (psi) | | |
|---|---|---|---|---|---|---|---|---|---|
| Mix ID | Accelerator | Modifier | Retarder | Corrosion Inhibitor | | | 24 Hours | 7 Days | 28 Days |
| 1 | 1.38 | 0.62 | 1.00 | 0.000 | 360 | 620 | 1910 | 7830 | 8780 |
| 2 | 2.08 | 0.92 | 1.00 | 0.025 | 300 | 500 | 3350 | 6130 | 8670 |
| 3 | 2.63 | 1.17 | 1.00 | 0.025 | 240 | 355 | 3680 | 6880 | 9180 |
| 4 | 3.46 | 1.54 | 1.00 | 0.025 | 180 | 220 | 3540 | 6610 | 8260 |
| 5 | 4.15 | 1.85 | 1.00 | 0.025 | 70 | 130 | 3490 | 5860 | 7330 |
| 6 | 2.63 | 1.17 | 1.00 | 0.040 | 240 | 355 | 3680 | 6880 | 9180 |
| 7 | 2.63 | 1.17 | 0.8 | 0.025 | 160 | 176 | 3500 | 6520 | 8150 |
| 8 | 2.63 | 1.17 | 0.6 | 0.025 | 38 | 48 | 3360 | 5750 | 7200 |
| 9 | 2.63 | 1.17 | 0.4 | 0.025 | 8 | 16 | 2940 | 5100 | 6380 |

Mixed and cured at 22° C.

Example 2

Table 2 shows similar results when concrete is made with the cement of Example 1. The times to set were adjusted to demonstrate the flexibility of the cement to accommodate construction requirements.

TABLE 2

Concrete Mixtures Made With Lactic Reactant and Varying Retarder Dose

| Example # | 1 | 2 | 3 | 4 | 5 | 6 | 7 |
|---|---|---|---|---|---|---|---|
| Fly ash wt. % | 17.49 | 17.49 | 17.49 | 17.49 | 17.49 | 17.49 | 17.49 |
| Accelerator wt. % | 0.783 | 0.783 | 0.783 | 0.783 | 0.783 | 0.783 | 0.783 |
| Modifier wt. % | 0.348 | 0.348 | 0.348 | 0.348 | 0.348 | 0.348 | 0.348 |
| Corrosion Inhibitor wt. % | 0.00 | 0.05 | 0.05 | 0.05 | 0.05 | 0.05 | 0.080 |

TABLE 2-continued

Concrete Mixtures Made With Lactic Reactant and Varying Retarder Dose

| Example # | 1 | 2 | 3 | 4 | 5 | 6 | 7 |
|---|---|---|---|---|---|---|---|
| Retarder wt. % | 0.247 | 0.22 | 0.247 | 0.272 | 0.197 | 0.206 | 0.215 |
| Portland cement wt. % | ~1 | ~1 | ~1 | ~1 | ~1 | ~1 | ~1 |
| Total cement wt. % | 19.868 | 19.891 | 19.918 | 19.943 | 19.868 | 19.877 | 19.916 |
| C33 Sand wt. % | 25.88 | 25.85 | 25.65 | 25.81 | 25.64 | 25.86 | 25.85 |
| #57 limestone wt. % | 50.89 | 50.89 | 50.89 | 50.89 | 50.89 | 50.89 | 50.89 |
| Mix Water wt. % | 3.36 | 3.36 | 3.54 | 3.36 | 3.60 | 3.37 | 3.37 |
| Total concrete wt. % | ~100 | ~100 | ~100 | ~100 | ~100 | ~100 | ~100 |
| Water:Total Cement Ratio | 0.169 | 0.169 | 0.178 | 0.168 | 0.181 | 0.169 | 0.169 |
| Mix Temperature (° C.) | 21 | 21 | 21 | 21 | 21 | 21 | 21 |
| Slump | 4 | 3.75 | 6 | 4 | 6 | 4 | 3 |
| Final set the (h:m) | 2:30 | 5:56 | >9: | >9 | 3:56 | 3:00 | 4:29 |
| Strength at age (psi) | | | | | | | |
| 1 day | 1600 | 1520 | 1190 | 1360 | 1880 | 1700 | 1590 |
| 3 days | 3750 | 3860 | 3790 | 4010 | 4890 | 4640 | 5210 |
| 7 days | 5190 | 5210 | 4850 | 5260 | 5360 | 5180 | 5870 |
| 28 days | 6260 | 6170 | 6480 | 6500 | 6300 | 6380 | 6430 |

"Total Cement" is the sum of fly ash, accelerator, modifier, corrosion inhibitor, retarder and Portland cement.

Example 3

Similarly, concretes can be made with reactants already having the retarder pre-incorporated into the reagent mixture solution. These have demonstrated similarly enhanced plastic properties. This, in some instances, provides convenience for production of concretes at remote locations without pre-blending all the components. As an example, compositions made in this way can be found in Table 3.

TABLE 3

| | Wt. Percent | | | | |
|---|---|---|---|---|---|
| Component | 1 | 2 | 3 | 4 | 5 |
| Boric acid | 0.00 | 0.00 | 0.00 | 0.00 | 3.00 |
| Aluminum sulphate | 30.00 | 10.00 | 2.00 | 10.00 | 5.00 |
| Sodium hydroxide | 0.00 | 0.00 | 0.00 | 50.00 | 2.00 |
| Lactic acid | 0.00 | 0.00 | 0.00 | 0.00 | 0.00 |

Example 4

Table 4 shows the volume stability of mortars made with the lactic acid activated cement. Their concrete design proportions are those shown in Table 1.

TABLE 4

ASTM C156 Shrinkage Values for Mortars from Table 1

| Sample # | 1 | 2 | 3 | 4 | 5 | 6 | 7 | 8 |
|---|---|---|---|---|---|---|---|---|
| 1 day | −0.001 | | −0.006 | −0.003 | −0.003 | −0.003 | −0.006 | −0.006 |
| 2 day | −0.009 | | −0.01 | −0.0045 | −0.005 | −0.011 | −0.009 | −0.009 |
| 3 day | −0.014 | | −0.012 | −0.006 | −0.007 | −0.015 | −0.011 | −0.015 |
| 7 day | −0.021 | | −0.018 | −0.016 | −0.015 | −0.022 | −0.022 | −0.023 |
| 14 day | −0.024 | | −0.023 | −0.020 | −0.022 | −0.030 | −0.028 | −0.026 |
| 28 day | −0.030 | | −0.028 | −0.023 | −0.028 | −0.030 | −0.028 | −0.030 |

Example 5

The effect on corrosion was determined using ASTM C1202. This method draws a current across a segment of a previously cast and prepared sample. The sample is placed between two chambers that are filled with specific liquid and a known current is passed across the cell for a period of six hours. The current passed is then measured and calculated as Coulombs of charge. Industry accepts a charge of less than 2000 Coulombs to be considered acceptable as inhibiting chloride induced corrosion. Table 5 shows the ratings for corrosion potential from American Concrete Institute (ACI) 222-01.

TABLE 5

| Corrosion Potential Rating (Coulombs of charge) | |
|---|---|
| High | >4000 |
| Moderate | 2000 to 4000 |
| Low | 1000 to 2000 |
| Very Low | 100 to 1000 |
| Negligible | <100 |

Concrete cylinders were prepared in accordance with Table 2, mix number 2, and cured for the desired durations. The boric acid content was varied from 0.000% to 0.100%. Table 6 shows the benefit of boron addition. The boron was added as boric acid from Rio Tinto and is expressed as a percentage of the total cement. As seen, the charge passed as Coulombs decreases both with increasing dosage of boric acid and also as a function of time of cure. A preferred dosage of between 0.025% and 0.050% by weight is most effective at inhibiting the corrosion due to chloride ion. A control mix of Portland cement which contains no fly ash was also prepared for comparative purposes. This mix did not have boric acid and retarder added. This mix was compensated to keep constant volume by the addition of sand.

It is clear that the addition of boric acid decreased the conductivity of the concrete. Furthermore, the conductivity decreased with curing time. It is noted that the Portland cement mixture did not improve with age significantly, and conductivity remained high.

TABLE 6

Conductivity Tests
ASTM C1202 Testing (Coulombs at Curing Times)

| Dosage Rate * | 14 Days | 28 Days | 56 Days | 90 Days |
|---|---|---|---|---|
| 0.000% | 5280 | 5200 | 4450 | 4570 |
| 0.010% | 4970 | 3820 | 2570 | 2390 |
| 0.025% | 3640 | 2890 | 2260 | 2000 |
| 0.050% | 2260 | 1840 | 1560 | 990 |
| 0.075% | 1850 | 1570 | 1140 | 1080 |
| 0.100% | 1750 | 1520 | 950 | 890 |
| Portland | 5840 | 5730 | 5760 | 5520 |

* based on percent of total cement

The above results show the effect of both increasing boric acid dosage and time on the protection of embedded steel.

Example 6

Table 7 shows the performance of boric acid additions to Portland cement alone. It can be seen that boric acid at these dosage rates have little effect on the performance of Portland with respect to corrosion mitigation when tested up to 14 days.

TABLE 7

Portland cement corrosion potential with boric acid additions

| Dosage (% Boric) | Charge (Coulombs) |
|---|---|
| 0 | 5840 |
| 0.01 | 5560 |
| 0.02 | 5680 |
| 0.05 | 5740 |
| 0.1 | 5890 |
| 0.2 | 5800 |

Example 7—Manufacturing Methods

Concretes may be produced by mixing all the ingredients except for the accelerator prior to use. The accelerator may be added at the time when the concrete is required. Once all the components are added, the chemical reaction leading to final set has been started. The specific blend will determine how much working time is available prior to the final set.

As example, a transit truck may load a mix at a batch plant. The transit truck now has 4-6 hours or more before the concrete will no longer be useable. At any point in that time period, the accelerator, as a liquid or as a solid power, may be added (most likely at the construction site), and the concrete may be placed. This ability provides a significant advantage over Portland cement concrete, which typically has only 90 minutes of acceptable working time from the moment the transit truck is loaded at the batch plant. Examples of concrete produced in this way are show in Table 8.

TABLE 8

| | Strength results of various binder contents | | | | | | |
|---|---|---|---|---|---|---|---|
| | 1 | 2 | 3 | 4 | 5 | 6 | 7 |
| Cement (kg/m^3) | 300 | 325 | 356 | 385 | 415 | 445 | 475 |
| Water:Cement Ratio | 0.40 | 0.35 | 0.32 | 0.27 | 0.25 | 0.22 | 0.21 |
| Time of Set (H:M) | 7:30 | 7:45 | 8:00 | 21:40 | 10:45 | 11:00 | 10:15 |
| Strength Development (psi) | | | | | | | |
| 1 day | 350 | 450 | 680 | 1010 | 1350 | 1420 | 2310 |
| 3 day | 1700 | 2110 | 2840 | 4310 | 4920 | 5050 | 5720 |
| 7 day | 2230 | 3050 | 3850 | 4980 | 5900 | 6210 | 7000 |
| 28 day | 3100 | 3800 | 5130 | 6140 | 6900 | 7460 | 7790 |

The volumetric mixable products (for example, Runs 5 and 7 of Table 8) may be made by adding uniform portions of cement, stone, and sand under remote control operation. The cement portion containing both the accelerator and the retarder may be blended with sand and stone in the high shear mixer. As an option to this approach, the accelerator and retarder may be added either in powder or liquid form.

The contents of all references, including published patents and patent applications cited throughout the application are hereby incorporated by reference.

It is understood that the detailed examples and embodiments described herein are given by way of example for illustrative purposes only, and are in no way considered to be limiting to the disclosure. Various modifications or changes in light thereof will be suggested to persons skilled in the art and are included within the spirit and purview of this application and are considered within the scope of the appended claims. For example, the relative quantities of the ingredients may be varied to optimize the desired effects, additional ingredients may be added, and/or similar ingredients may be substituted for one or more of the ingredients described. Additional advantageous features and functionalities associated with the systems, methods, and processes of the present disclosure will be apparent from the appended claims. Moreover, those skilled in the art will recognize, or be able to ascertain using no more than routine experimentation, many equivalents to the specific embodiments of the disclosure described herein. Such equivalents are intended to be encompassed by the following claims.

The invention claimed is:

1. A hydratable cement composition comprising:
   (a) lactic acid in an amount up to about 8.0% by weight;
   (b) one or more alkali metal hydroxides or carbonates in an amount up to about 9.0% by weight;
   (c) one or more corrosion inhibiting boron containing compounds in an amount up to about 5.0% by weight;
   (d) between about 48% and about 93.5% by weight of one or more self-cementing pozzolans;
   (e) between about 1.5% and about 45% by weight of Portland cement;
   (f) one or more non-boron containing retarders in an amount up to about 4.0% by weight; and
   (g) optionally, one or more beneficiating agents in an amount up to about 20% by weight.

2. A hydratable cement composition according to claim 1, wherein the cement composition is substantially free of monocarboxylic acids.

3. A hydratable cement composition according to claim 1, wherein the cement composition is substantially free of citric acid salt activators, lactic acid salt activators, pH neutral salt activators, either aqueous or solid.

4. A hydratable cement composition according to claim 1, wherein the alkali metal hydroxide or carbonate is selected from the group consisting of potassium hydroxide, sodium hydroxide, lithium hydroxide, potassium carbonate, sodium carbonate, lithium carbonate, potassium bicarbonate, sodium bicarbonate, and lithium bicarbonate and combinations thereof.

5. A hydratable cement composition according to claim 1, wherein the boron containing compound is selected from the group consisting of boric acid and boron oxyanions and combinations thereof.

6. A hydratable cement composition according to claim 1, wherein the boron containing compound is selected from the group consisting of borax, boric acid, borates, and tetraborates, and combinations thereof.

7. A hydratable cement composition according to claim 1, wherein the non-boron containing retarder is selected from the group consisting of aluminum sulphate, phosphonic acid compounds, phosphonates, gluco-heptonates, organic based retarders and combinations thereof.

8. A hydratable cement composition according to claim 1, wherein the self-cementing pozzolan comprises Class C fly-ash.

9. A hydratable cement composition according to claim 1, wherein the self-cementing pozzolan further comprises Ground Granulated Blast Furnace Slag (GGBFS).

10. A hydratable cement composition according to claim 1, wherein the self-cementing pozzolan comprises at least 20% by weight lime expressed as CaO.

11. A hydratable cement composition according to claim 1, wherein the self-cementing pozzolan has a lime content of at least 23% by weight and the lime is provided by the pozzolan.

12. A hydratable cement composition according to claim 1, wherein the beneficiating agent is selected from the group consisting of calcium hydroxide, calcium oxide, calcium acetate, and calcium lactate, and combinations thereof.

13. A hydratable cement composition according to claim 12, wherein the beneficiating agent further comprises wollastonite, calcium aluminates, silica fume, rice hull ash, class F pozzolan, class N pozzolan, and combinations thereof.

14. A hydratable cement composition according to claim 1, wherein the silica to calcia ratio (expressed as oxides) is between about 0.90:1 and 1.5:1.

15. A hydratable cementitious composition comprising the hydratable cement composition according to claim 1.

16. A hydratable cementitious composition according to claim 15 further comprising one or more fillers selected from the group consisting of Class F fly-ash, Class N pozzolanic ash, fine aggregate, and combinations thereof.

17. A concrete composition comprising the hydratable cement composition according to claim 1.

18. A concrete composition according to claim 17, wherein the concrete composition passes less than 4000 Coulombs of charge after 90 days cure, when tested in accordance with ASTM C1202.

19. A concrete composition according to claim 17, wherein the concrete composition passes less than 2500 Coulombs of charge after 90 days cure, when tested in accordance with ASTM C1202.

* * * * *